Aug. 25, 1964    L. H. SCHMOHL    3,146,006
BOSS JOINT WITH METALLIC SEAL RING
Filed June 8, 1960
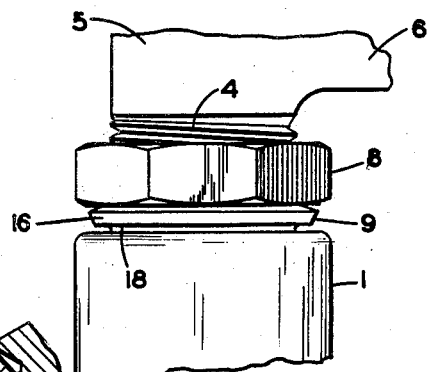
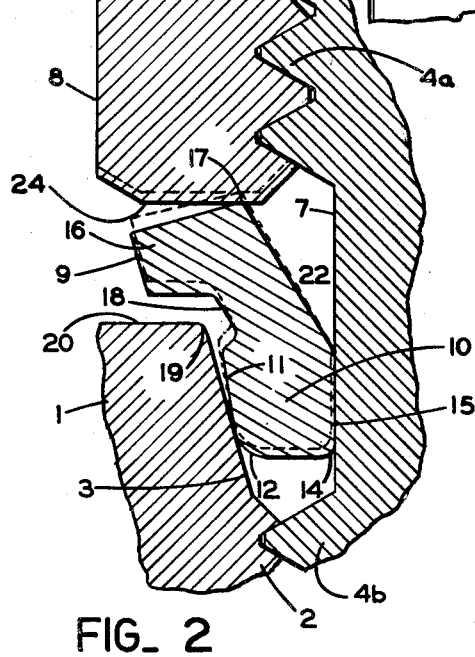
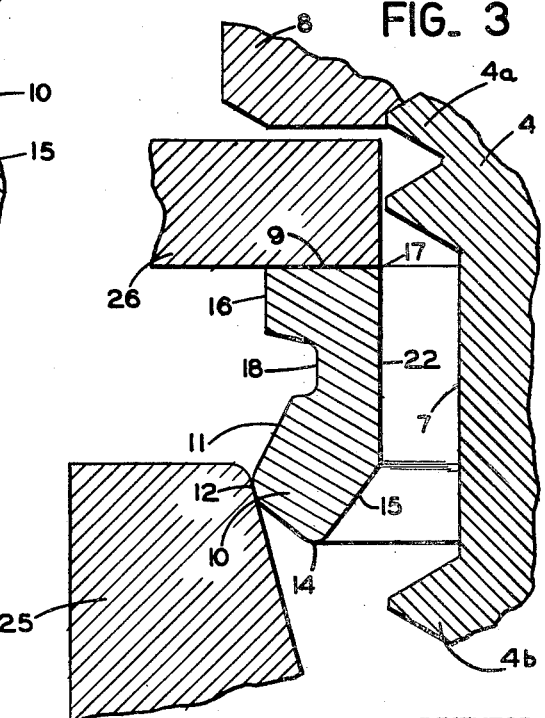
INVENTOR.
LELAND H. SCHMOHL
BY
Oberlin, Maky & Donnelly
ATTORNEYS

United States Patent Office 3,146,006
Patented Aug. 25, 1964

3,146,006
BOSS JOINT WITH METALLIC SEAL RING
Leland H. Schmohl, Moreland Hills, Ohio, assignor to Parker-Hannifin Corporation, Cleveland, Ohio, a corporation of Ohio
Filed June 8, 1960, Ser. No. 34,760
2 Claims. (Cl. 285—212)

The present invention relates generally as indicated to a boss joint employing a metallic sealing ring and, more particularly, to a so-called "universal" boss joint in which an internally threaded boss has screwed thereinto the leg of an elbow, T, or like fitting, the fitting being locked in any desired rotary position by means of a locknut.

In conventional boss joints of the general type referred to above, the boss terminates in an unthreaded countersink and the fitting has an unthreaded peripheral groove located concentrically within such countersink, there being a packing ring of rubber-like material (such as an O-ring) squeezed between such countersink and groove to seal the joint, and the locknut being drawn down tight against the end face of the boss to retain the packing ring in place and to lock the fitting in selected rotary position. For high pressure applications, it has been proposed to clamp a rigid metal washer between the locknut and the end face of the boss, the washer being a snug fit on the groove of the fitting to eliminate crevices or gaps into which the packing ring could extrude under the influence of high fluid pressure or pressure pulsations.

As apparent, such boss joints with rubber-like packing rings have certain limitations due to inherent characteristics of rubber-like material. Thus, the rubber-like packing ring may be affected by certain fluids so that different compositions must be used in connection with the different fluids to be sealed. Also, such materials are not usable throughout as broad a temperature range as are metals.

Accordingly, it is a principal object of this invention to provide a universal boss joint which has a metallic seal ring, thereby obviating the inherent limitations encountered with joints employing rubber-like packing rings.

It is another object of this invention to provide a universal boss joint in which the metallic seal ring thereof is made of a strong, durable, corrosion resisting metal thereby enabling use of the same joint in different fluid systems without regard to the properties of the fluid itself, to the lowest or highest temperatures apt to be encountered, and to the magnitude of the fluid pressure.

It is another object of this invention to provide a universal boss joint of the character indicated in which the metallic seal ring is firmly wedged between the boss countersink and the fitting groove to provide fluid tight seals therewith and to augment the locknut in frictionally locking the fitting against rotation.

It is another object of this invention to provide a universal boss joint of the character indicated in which the locknut, while performing the function of urging the metallic seal ring into wedged position between the boss countersink and the fitting groove, also exerts frictional locking influence on the fitting to resist turning of the latter.

It is another object of this invention to provide a universal boss joint as aforesaid in which there is a burnishing action of the metallic seal ring against the boss countersink and fitting groove during assembly of the joint whereby these surfaces need not be any smoother than obtained with ordinary countersinking or turning techniques.

It is another object of this invention to provide a universal boss joint of the character indicated wherein the metallic seal ring thereof has a rounded external corner to make a fluid tight joint with the boss countersink by burnishing action and without the ring gouging into the countersink, said ring also having an inner cylindrical surface of considerable axial extent to make fluid tight engagement with the fitting groove without indenting the latter whereby the joint may be repeatedly made up and sealed.

It is another object to provide a universal boss joint of the type indicated wherein the metallic seal ring and the locknut are initially devoid of undercuts in their outer surfaces so as to facilitate manufacture thereof.

It is another object to provide a means for preventing further tightening of the locknut after there has been a predetermined amount of overtightening.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawing:

FIG. 1 is a side elevation view showing a universal boss joint employing a metallic seal ring;

FIG. 2 is a much enlarged radial cross section view with the full lines showing the parts in final assembled position and with the dotted lines showing the locknut and metallic seal ring in loosely assembled position; and FIG. 3 is a view similar to FIG. 2 except showing the preferred form of seal ring slipped over the fitting threads and disposed around the fitting groove prior to being preset against the fitting groove as with suitable dies.

In said drawing, the reference numeral 1 denotes generally a boss formed as on a valve body, a pump housing, a fluid cylinder, etc., said boss being provided with internal threads 2 of uniform pitch diameter and terminating in an unthreaded flare mouth or countersink 3 which preferably has a wedge taper of from about 24° to 30° included angle.

Screwed into said boss 1 is the externally threaded leg of a fitting 5, such as an elbow or T for example. With a so-called "universal boss joint" it is possible to position the lateral leg 6 (or lateral legs in the case of a T fitting) so as to extend radially in any desired direction about the axis of leg 4. For that purpose, the leg 4 is formed with an unthreaded peripheral groove 7 which is disposed between upper and lower straight threaded sections 4a and 4b of like pitch and pitch diameters, and positionable concentrically within the boss countersink 3. Beyond the groove 7 on the upper threaded section 4a, the fitting leg 4 has screwed thereon a locknut 8 which, as presently to be described in detail, serves to wedge the metallic seal ring 9 into sealed engagement with the boss countersink 3 and the fitting groove 7 and to frictionally lock the fitting 5 with its lateral leg 6 in desired rotary position.

The seal ring 9, as best shown in FIG. 2, is preferably made of strong, durable, corrosion resisting metal such as stainless steel and is formed with a relatively thick tubular body section 10, the outer surface 11 of which is slightly tapered as shown at an angle less than that of the countersink 3. The body section 10 is adapted to be wedged by the locknut 8 between the countersink 3 and the groove 7, the corners 12 and 14 being rounded or broken, as shown, to preclude gouging of the countersink 3 and the groove 7. The inner surface 15 of the seal ring 9 is preferably cylindrical and of substantial axial length, as shown, and may initially be in sliding contact with groove 7 or have a slip fit on the groove 7, as shown by the dotted outline in FIG. 2. The other end of the seal ring 9 terminates in a canted outturned flange 16 which is engaged by the annular end face of the locknut 8 at a circular line contact zone 17 which is radially inward of the maximum diameter of the countersink 3 and of substantially the same diameter as the initial circular line contact of the rounded corner 12 with countersink 3 so that the seal ring 9 is put under direct compression when wedged by the locknut 8 between countersink 3 and groove 7. The body section 10 and the canted flange 16 of seal ring 9 are joined by a frusto-conical neck section 18 which has a radial thickness less than that of the body section 10 so as to facilitate yielding of the latter when wedged between countersink 3 and groove 7. The neck section 18 also clears the corner 19 of the countersink 3 whereby the neck section may enter countersink 3 upon tightening of locknut 8.

The seal ring 9 may be made initially to the form shown in FIG. 3 so that it may be passed over the threads of leg 4 to a position surrounding the fitting groove 7 and thereafter contracted into the groove to the dotted position shown in FIG. 2 by suitable die elements 25 and 26. This locks the ring 9 and locknut 8 to the fitting 6 to form a permanent assembly of the three parts for facilitating handling as well as assembly to boss 1.

As shown in FIG. 3, the initial shape of the ring is such that the external surfaces thereof, that is, all externally facing surfaces, except tapered countersink 15, are formed without undercuts so as to facilitate manufacture of the same. The countersink 15 may, of course, be readily formed with the same tool used for forming cylindrical bore 22. Likewise, the nut 8 is of conventional form with flat, non-undercut end surfaces 23 and 24 for simple manufacture thereof.

As further shown in FIG. 3, the outer surface 11 of the sleeve head portion 10 is initially formed with a reverse taper with the sleeve head portion 10 having its greatest cross section thickness adjacent the undercut 18 and with the largest diameter of the outer surface 11 being at the lower end of the ring adjacent the rounded corner 12 so that the corner 12 may be contacted by one of a suitable pair of dies 25, 26, for contracting or presetting the metallic seal ring into groove 7.

During the presetting operation, the head portion 10 is radially contracted and the ring assumes the position shown by the dotted line of FIG. 2. In this position, the ring surface 15 lies closely adjacent and substantially parallel to the outer surface of groove 7 while bore 22, which was initially cylindrical, is now outwardly tapered to form a countersink. Surface 11 has reversed its taper and is nearly at the same angle as boss countersink 3. The relationship of surface 11 to countersink 3 is such that initial contact of sleeve head portion 10 with countersink 3 will be at the forward end of the ring and on a circular contact line at the rounded corner 12.

Meanwhile, the flange 16 has swung so that its outer end surface is no longer parallel with nut surface 24, thus providing contact zone 17 which is substantially a circular line contact on about the same diameter as the initial line of contact between the surface 11 and countersink 3. The relatively short axial length of flange 16 plus the necked down section 18 facilitates the presetting operation because the flange can swing to the position shown in FIG. 2. When the flange 16 swings to the position shown in FIG. 2 during the presetting operation, the corner 17 expands in diameter a slight amount and since it was initially slightly greater in diameter than the external diameter of upper thread portion 4a, a portion of the thread 4a may enter part way into the now tapered bore 22 as the leg 4 is threaded into the boss 1 to certain selected angular positions of the leg 6, thus helping to keep the overall length of the leg 4 to a minimum.

In making up this boss joint, the fitting leg 4 is screwed into the boss 1 until the groove 7 is concentrically within the countersink 3. The fitting 5 may then be turned in further or backed off until the lateral leg 6 points in the desired direction, whereupon the lock nut 8 is turned relative to the fitting 5 to press the seal ring 9 axially inward. Such inward movement of the seal ring 9 wedges the heavy and strong body section 10 between the countersink 3 and the groove 7 thereby establishing fluid-tight seals therewith adjacent the point of tangency of the rounded corner 12 and surface 11 of the body section 10 and along the cylindrical surface 15 respectively. It is to be observed that as the seal ring 9 is thus pressed axially inward by the locknut 8, the rounded corner 12 slides along the countersink 3 to effect a burnishing action whereby countersink need not have a smooth finish. Similarly, after the body section has been contracted to the extent that surface 15 contacts groove 7, further tightening of the locknut 8 will effect burnishing and sealing action on groove 7 as the surface 15 slides in contact therewith.

The wedging of the axially inner end of the seal ring 9 as aforesaid frictionally locks the fitting 5 against rotation from its preset position to augment the locking function of locknut 8. The flange 16 projects radially beyond the corner 19 of the boss counterbore and in the event the nut 8 is overtightened, the flange 16 will contact the end surface 20 of the boss to limit the overtightening before damage can be done to the parts.

When it is desired to disassemble the joint, the locknut 8 is loosened and the fitting 5 is unscrewed from the boss 1, the seal ring 9 tending to spring back to its original preset condition whereat the inner cylindrical surface 15 of flange 11 is a close slide fit on groove 7. The fitting 5 may be reassembled any number of times in the same boss 1 or in different bosses. Furthermore, by reason of the wide surface 15 of the seal ring 9 there is no preceptible indenting of the groove 7 whereby a fluid tight seal is assured despite repeated disassembly and reassembly of the joint. By way of example, in a boss joint for use with 1″ diameter tubing, good results have been achieved with a stainless steel seal ring 9 having approximately the following dimensions:

| | |
|---|---|
| Diameter of surface 15 and groove 7 _____inches__ | 1.20 |
| Axial length of surface 15 _____do____ | 0.08 |
| Maximum radial thickness of body section 10 _____do____ | 0.09 |
| Taper of outer surface 11 _____degrees__ | 9 |
| Radial thickness of neck section 18 _____inches__ | 0.05 |
| Taper of neck section 18 _____degrees__ | 31 |
| Mean thickness of flange 16 _____inches__ | 0.06 |
| Axial length of seal ring 9 _____do____ | 0.20 |

From the foregoing, it is evident that the instant boss joint fulfills the several stated objects of the invention and provides a leak-proof high pressure, high (or low) temperature joint in a variety of different fluid systems without need of careful selection of the composition of a rubber-like material as required in known universal boss joints.

Other modes of applying the principle of the invention may be employed, change being made as regards the details described, provided the features stated in any of the following claims, or the equivalent of such, be employed.

I claim:
1. In combination, a member having a tapered wall socket forming a countersink leading to an internal thread, a fitting having spaced upper and lower threaded areas, said lower threaded area being in engagement with said internal thread, said fitting having a peripheral cylindrical surface disposed between said threaded areas concentrically within said countersink, a locknut threaded onto said upper threaded area and disposed in a region axially beyond said surface, a metallic seal ring extending from between the walls of said countersink and said cylindrical surface toward said locknut, said ring being formed with a tilted radially extending flange engage- able by said locknut on a circular line contact when the latter is turned on said fitting to thereby move said ring axially relative to said member and fitting, said ring also being formed with a body section which is radially wedged between the walls of said countersink and said cylindrical surface into fluid tight sealing engagement therewith as a consequence of such axial movement of said ring, said body section having an inner cylindrical surface of substantial axial length in contact with said cylindrical surface of said fitting to preclude indenting of the latter when said body section is thus wedged between said countersink wall and said cylindrical surface of said fitting, said body section engaging said countersink wall in circular substantially line contact of substantially the same diameter as the circular line contact between said flange and said locknut, whereby said ring is placed under substantially direct axial compression when said body section is wedged between said countersink wall and said fitting cylindrical surface.

2. The combination of claim 1 wherein said ring has an intermediate peripheral groove that forms a tapered neck portion of less radial thickness than the adjoining body section and flange and of less maximum diameter than the large end of said countersink wall for clamping engagement of said flange between said locknut and said member upon overtightening of said locknut.

References Cited in the file of this patent

UNITED STATES PATENTS

| | | |
|---|---|---|
| 2,320,812 | Cowles | June 1, 1943 |
| 2,342,425 | Parker | Feb. 22, 1944 |
| 2,343,235 | Bashark | Feb. 29, 1944 |
| 2,484,815 | Crawford | Oct. 18, 1949 |
| 2,511,134 | Stranberg | June 13, 1950 |
| 2,641,487 | La Marre | June 9, 1953 |
| 3,003,795 | Lyon | Oct. 10, 1961 |

OTHER REFERENCES

Publication of the L and L Manufacturing Co., 8088 East Nine Mile Road, Van Dyke, Michigan. Catalog No. 53.